Nov. 10, 1925.
S. PLAWKER
1,560,942
SHOE SOLE TRIMMING MACHINE
Original Filed March 3, 1922     2 Sheets-Sheet 2
FIG. 3.
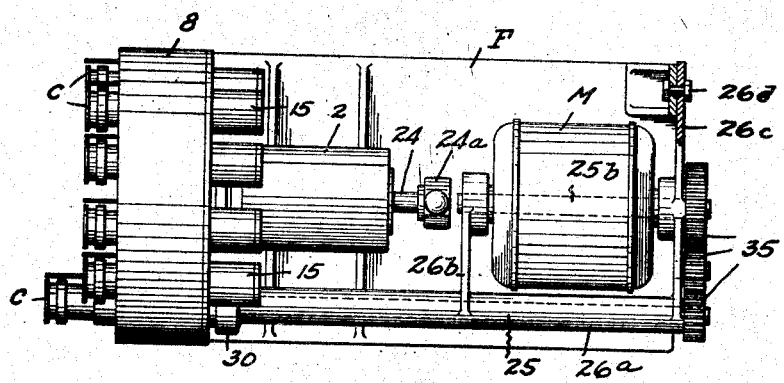
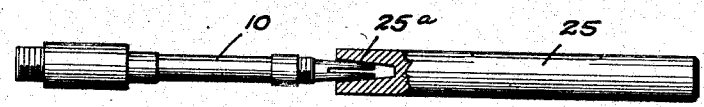
FIG. 4.
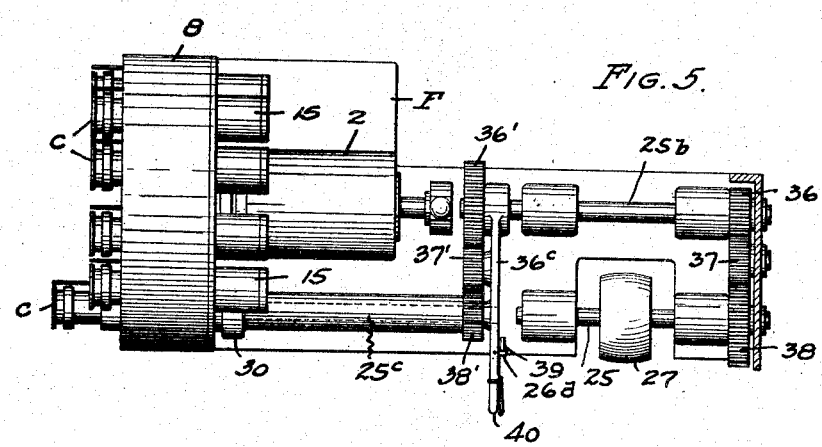
FIG. 5.
WITNESS:
H. Sherburne
INVENTOR.
Samuel Plawker.
BY White Prest Evans
his ATTORNEYS.

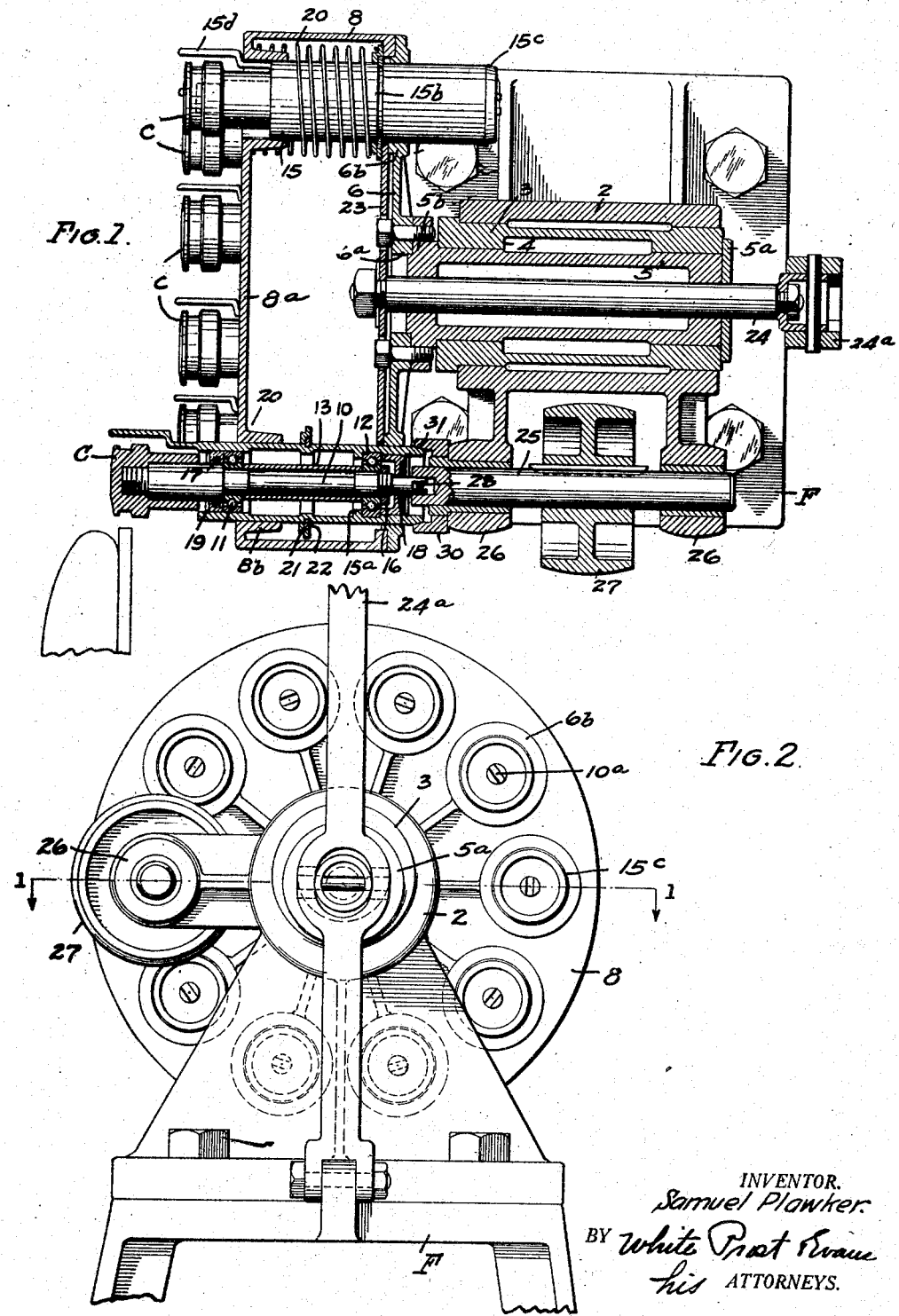

Patented Nov. 10, 1925.

1,560,942

UNITED STATES PATENT OFFICE.

SAMUEL PLAWKER, OF SAN FRANCISCO, CALIFORNIA.

SHOE-SOLE-TRIMMING MACHINE.

Application filed March 3, 1922, Serial No. 540,734. Renewed May 2, 1925.

*To all whom it may concern:*

Be it known that I, SAMUEL PLAWKER, a citizen of the United States, and a resident of the city and county of San Francisco, State of California, have invented a new and useful Shoe-Sole-Trimming Machine, of which the following is a specification.

This invention relates to a type of machine in which there is utilized one or more rotary cutters driven at a high rate of speed and against which the edge of a boot or shoe sole is pressed while at the same time the shoe is manipulated by an operative so as to pass its sole edge along the rotating cutter. I have heretofore disclosed an improved sole trimming machine having a plurality of rotatable cutters, each cutter having a shaft adapted to be shifted into axial alinement with a single drive shaft, this in turn being driven from any suitable main shaft or transmitting mechanism.

My present invention has for its object to make improvements in means for securing a ready co-ordination of any one of a plurality of cutter shafts with a common drive shaft.

A further object is to provide for the accurate adjustment of each one of a plurality of cutter shafts with the common drive shaft and further, an object is to provide for the effective coupling of the cutter shaft with the drive shaft and at the same time to provide for the secure holding of the selected cutter shaft in co-axial alinement with the driving shaft.

A further object is to provide a simple, practicable, and easily operated means enabling the concurrent shifting of all of the cutter shafts to such a position that any one of the cutter shafts can be quickly and readily brought into co-ordinate position with the drive shaft. In this connection an object is to provide means for automatically restoring all of the cutter shafts, except the selected cutter shaft, to a normal idle position, while the selected cutter shaft is supported and rotated while in a relatively projected, effective, sole-trimming position.

As individual operatives of machines of this character commonly differ greatly in the height of their statures, an object is to provide means whereby the effective cutting position of any of the trimming cutters can be readily changed to most conveniently serve the operative, as determined by his most effective working position. In this connection it is also an object to provide means for driving the cutter drive shaft at any desired speed and especially at a speed greater than the speed of a main or motor shaft as the case may be, since it is desirable to operate the trimming cutters at speeds above 5,000 revolutions per minute, as contrasted with effective motor speeds of 2,500 to 3,000 revolutions.

The invention possesses other objects and features of advantage, some of which, with the foregoing, will be made manifest in the following description of the preferred form of the invention, which is illustrated in the drawings accompanying and forming part of the specification. It is to be understood that it is not intended to limit the invention to the embodiment shown by the said drawings and description, as variations may be adopted within the scope of the invention as set forth in the claims.

Figure 1 is a horizontal, axial section through the general head construction of the machine, certain parts being in plan.

Fig. 2 is a rear end elevation of the upper portion of the machine and a part of its frame.

Fig. 3 is a plan view, partly in section, of the head structure of a modified form of the machine in which the cutter drive shaft is adapted to be adjusted in a substantially vertical plane.

Fig. 4 shows a modified form of chuck for connecting a cutter shaft and the driving shaft.

Fig. 5 is a somewhat diagrammatic representation of a modified form of cutter drive.

Broadly, my invention consists of a main bearing in which there is eccentrically adjustable a shaft carrying a turret head upon which is mounted a plurality of cutter shafts, each of which is adapted to be rotated to be selectively coupled to a lateral drive shaft which is preferably parallel to the axis of the turret shaft. Means including an eccentric device provides for shifting of the head bodily so as to provide for co-axial positioning of the selected cutter shaft and the drive shaft. Further, the invention consists of means for concurrently shifting all of the cutter shafts to provide for the rotation of the turret head, in which they are mounted, to a given position so that a selected shaft can be coupled to the drive shaft.

More specifically, the preferred embodiment of my invention includes a substantial bearing block or casting 2 in which is rotatively set a bushing 3 and this has an eccentric bore 4 in which is fitted a hollow hub or trunnion 5, to the rear end of which is secured a clamping disc or shoulder part 5ª, overlapping the contiguous end of the bushing 3 to prevent longitudinal shifting of the trunnion 5 which has, at its front end, a flange or shoulder 5ᵇ bearing against the front end of the bushing 3.

Secured upon the front of the flange 5ᵇ is what may be termed a turret head including a back plate 6 through which passes fastening cap screws 7 holding the plate against the flange 5ᵇ which latter may be provided with a shoulder entering the center hole 6ª of the head plate 6 and centering the plate, as well as supporting it. Abutted against the front marginal portion of the head plate 6 is a shell or casing having a generally circular flange 8, closed across the front end by a front wall 8ª, opposite to which the casing flange is open where it abuts against the head 6.

A multiplicity of relatively different rotary sole cutters, one of which is shown at C, are adapted to be mounted upon respective shafts 10, these in turn being supported in the rotary turret head 6—8. Each of the shafts 10 is preferably supported in sets of ball bearings 11 and 12 which are spaced on the shaft by a spacing sleeve 13. The outer ends of the shafts 10, all of which are arranged on parallel axes in the turret head are designed to receive a given cutter C, while the rear or inner end of each shaft is appropriately constructed and designed to be operatively interlocked with a driving shaft to be described hereinafter.

Preferably each of the shafts 10 is mounted within a bearing sleeve 15 of cylindrical form, one portion of which is supported slidably in an inwardly extending hub 8ᵇ of the turret wall 8, while the other end of the sleeve is slidably arranged in a respective aperture 6ᵇ in the outer portion of the disc 6 of the head. It is understood that the structural features of each of the shafts and each of the bearing sleeves being substantially identical, a description of one will suffice for all. Similarity of the designs of the shafts and their bearings provides universal interchange facilitating repair, adjustment and renewals, as may be necessary. As shown, the outer race rings of the ball bearings 11 and 12 are snugly fitted in the bearing sleeves 15; each sleeve being provided with an inner shoulder 15ª against which the rear ball bearing outer race ring is set. The inner race ring of each rear ball bearing 12 is secured by a locknut 16, screwed on the rear portion of its shaft 10. Suitable packing means may be utilized to retain the lubricant within the sleeve bearings, as for instance, comprising a front packing ring 17 and a rear packing ring 18, these being held in place as by snap rings 19.

From the above it will be seen that each of the bearing sleeves 15 is adapted to be shifted axially in its bearings and the bearings are normally, yieldably pressed to a retracted, idle position by suitable means preferably comprising individual springs 20, shown as surrounding respective sleeves 15 and being supported at the base of the contiguous hub 8ᵇ, while the opposite end of each spring, which is of the expansible character, reacts against a shoulder forming structure provided on the sleeves 15. Such a shoulder may comprise a washer 21 having a countersunk face on one side to encompass a split ring 22 fitting in a circumferential groove 15ᵇ provided therefor between the ends of a sleeve 15. Each of the springs 20 therefore tends to press its sleeve 15 toward the rear disc 6 of the turret head to an idle or retracted position at which it is limited by a suitable means. The limiting or stop means also serves as a means for concurrently shifting all of the sleeves 15 forwardly in the turret head so as to project the forward ends of the sleeves and conversely, withdraw the rear projecting ends of the sleeves from their normal position so that the turret head can be rotated in its bearing 3 to carry any one of the cutter shafts 10 into co-axial position with respect to what may here be called a drive shaft 25.

The shifting means is shown in the present case as consisting of a disc 23 of a sufficient diameter or of such form as to have a portion engageable with the shoulder forming means as the split rings 15ᶜ mounted on the cutter shaft bearing sleeves 15. The disc 23 is clamped at its center on the contiguous end of a spindle or shank 24, shiftably arranged in central apertures in the ends of the hollow trunnion 5, carrying the turret head. The rear end of the shank 24 is suitably connected to a shifting means as a lever 24ª which is pivoted, for instance, upon a suitable frame F on which the edge structure of the machine is mounted. By means of the lever 24ª the shifting means including the plate 23 can be forced forwardly against the action of the several bearing springs 20, to shift the bearings with their shafts forwardly to such a degree as to permit clearance of the rear ends of the bearing sleeves 15 when the turret head is rotated. This clearance is to provide for the swinging of the rear ends of the shafts 10 and their sleeves 15 past the contiguous end of the drive shaft 25 and also past a centering means associated with the shaft.

The drive shaft 25 is preferably arranged on an axis parallel to the axis of rotation of the turret head and is supported in suitable bearings 26 at the side of the main bearing 2. The radial distance from the center of the main bearing and from the center of the turret head to the axes of the cutter shafts 10 is designed to be substantially equal to the radial distance from the axis of the main bearing to the axis of the shaft 25 but for the purpose of compensating for inaccuracies of workmanship the eccentrically bored bushing 3 enables the axis of the turret head to be shifted laterally to accurately co-axially aline any selected cutter shaft 10 with the driving shaft 25. This shaft is designed to be driven by power from any suitable source and may be provided with a pulley wheel 27 to receive a driving belt, not shown, and extending down to a master pulley shaft. As shown in Fig. 1, the driving end of the drive shaft 25 is countersunk to receive the adjacent reduced ends of the cutter shafts 10 and suitable means are provided to secure a driving interlock between the drive shaft and the cutter shafts. Such means may comprise a cross pin 28 in the countersunk end of the shaft 25, this pin being adapted to enter a slot 10$^a$, of which one is provided in each shaft 10.

Thus, after all of the shafts 10 and their sleeves 15 have been pushed forwardly by the shifting plate 23 and when the desired shaft 10 of the set of cutters is swung around to register with the drive shaft 25, and as the plate 23 is drawn back or is pushed back by the spring 20, all of the shafts therein shift back to normal idle position except the selected shaft whose slotted end enters the socket in the adjacent end of the drive shaft 25 and becomes interlocked therewith so that the selected shaft 10 is driven when the shaft 25 is operating.

A feature of the invention consists of means for centering the selected shaft 10 as to the drive shaft 25 and also for holding the turret head against rotation. Such centering device may comprise a chuck like ring 30 mounted on the forward end of one of the bearings 26 of the shaft 25; the ring having a conical interior face 31 and this is engageable by a complementary conical end face 15$^c$ with which each sleeve 15 is provided. As the registered sleeve and its shaft 10 are partially shifted with the retracting movement of the shifting plate 23, the centering means 30 and 31 mutually engage and the slotted end 10$^a$ of the given shaft 10 slips over the driving pin 28 in the drive shaft 25. The springs 20 of the inoperative cutter shaft sleeves 15 all unite to press the shifting plate 23 to the rear end of the turret head where it is limited as by engagement against a contiguous surface, as the rear head disc or wall 6. It will be clear from the above that the centering means, when effective, also serves as a means to hold the turret against rotation.

Since each of the shafts 10 is designed to be provided with its individual cutter, each cutter different from the other, it is only necessary in order to present a given cutter at the operative position at the head structure of the machine to shift the shifting plate 23 forwardly in the turret to press all of the shafts 10 and their bearings 15 to their foremost position, at which time the conical ends 15$^c$ of the bearing sleeves 15 will assume a position in a plane just clear of the front end of the clutch ring 30 and therefore the head can be rotated in its journal 3 until any one of the cutter shafts is registered with the drive shaft 25, whereupon the head becomes locked and the withdrawal of the plate 23 permits all of the inoperative bearing sleeves 15 to shift back. This leaves the engaged cutter shaft in projected position so that work can be applied to the selected cutter C thereon.

If desired, each bearing sleeve 15 may be provided with an arcuate shield-like portion 15$^d$ to overhang a portion of the operating cutter C so that only one side of the latter is presented toward the operative doing work at the machine.

In Fig. 3 a modification of my invention is shown in which the cutter drive shaft 25 is adapted to be raised and lowered substantially vertically while on a horizontal axis so that the machine can be most effectively adjusted to facilitate its use by different operatives according to the height of the stature of the operative. Such an adjustment may be secured as by means of a vertically adjustable bearing 26$^a$ having laterally extending arms 26$^b$ so pivoted at one end as to allow the oscillation of the shaft carrying portion. Preferably the bearing arms 26$^b$ are pivoted on bearings concentric to the axis of a drive shaft, as 25$^b$, and which is preferably co-axial with the axis of the turret head 6. If desired, a driving motor M may be combined with the driving or main shaft 25$^b$, thus eliminating extraneous drive means. It is desirable to provide for an increase in the speed of the drive shaft 25 with respect to the motor shaft 25$^b$ and to that end these shaft are interconnected by a set of transmission gears 35, the gear on the shaft 25 being of less diameter than the gear on the motor shaft 25$^b$ so that the drive shaft is speeded up. This form of the invention therefore provides, in a simple combination, for adjustment of the drive shaft to be coordinated with a rotary cutter at a position most convenient to the operative and also provides for the desired speed of operation of the cutters.

In Fig. 4, a modified form of driving connection, as between the drive shaft 25 and a cutter shaft 10, is illustrated. This consists of a simple form of tapered socket 25ª in the end of the drive shaft to frictionally engage the tapered end of the contiguous cutter shaft 10.

To increase the frictional grip of the tapered shank in the socket 25ª, the shank is split and under centrifugal action it tends to expand in its socket. Slipping is therefore prevented.

From the above it will be seen that I have provided a set of cutter shafts each carrying a cutter and I have provided means for effectively coupling the selected cutter shaft and a drive shaft. Thus any shaft and its cutter, can be operatively connected to a drive shaft by a simple chuck or coupling.

An extension 26ᶜ is adapted to receive a fastening bolt 26ᵈ, to hold the bearing 26ª, set at any of its positions.

In Fig. 5 I have shown a construction in which the cutter is driven from a countershaft instead of from a motor and in which the position of the operating cutter may be elevated or depressed to suit the individual worker. In this construction power is applied to the countershaft 25 through a belt operating on a pulley 27 secured to said shaft. Alined with the axis of the turret head is a jack-shaft 25ᵇ, rotatable in fixed bearings, which is driven from the countershaft 25 through the train of gears 36, 37 and 38, dimensioned to produce a jack-shaft speed greater than the countershaft speed. The gears 36, 37 and 38 are enclosed in a housing and the gear 37 is journaled on a stub shaft carried by said housing. The cutter head shaft 25ᶜ is driven from the jack-shaft and at a higher speed by the train of gears 36', 37' and 38', the latter being secured to the cutter shaft. The cutter shaft is journaled in a lever 36ᵉ rotatably mounted on the jack-shaft and the intermediate gear 37' is also carried by the lever, so that, by movement of the lever, the position of the cutter shaft may be raised or lowered without interfering with the driving connection. The lever is held in adjusted positions by engagement of a latch 26ᵈ thereon with a fixed arcuate rack 39. The latch is preferably arranged to be retracted by the usual spring pressed grip associated with the handle 40 of the lever and when in engagement with the rack, holds the lever in fixed adjusted position.

While in Fig. 3, I have shown a train of three gears 35 connecting the motor shaft with the drive shaft and in Fig. 5, I have shown a train of three gears connecting the countershaft with the jack-shaft and another train of three gears connecting the jack-shaft with the drive shaft, it is evident that in each of these instances, two meshing gears may be employed instead of three, the gears being of different diameter to produce the desired speed increase.

I claim:

1. In a sole trimming machine, a main bearing, a turret head shaft, a turret head on said shaft, a set of cutter shafts in said head and extending at one end therethrough, a drive shaft spaced laterally from the axis of the turret; all the shafts being parallel, and means within the head for concurrently shifting all the cutter shafts axially in the head while maintaining their parallelism so that any one of them may be operatively connected to the drive shaft.

2. In a sole trimming machine, a main bearing, a turret head shaft, a turret head on said shaft, a set of cutter shafts in said head and extending at each end therethrough, a drive shaft spaced laterally from the axis of the turret; all the shafts being parallel, and means within the head for concurrently shifting all the cutter shafts axially in the head while maintaining their parallelism so that any one of them may be operatively connected to the drive shaft, and means for automatically restoring all unconnected cutter shafts to idle position.

3. In a sole trimming machine, a main bearing, a turret head shaft, a turret head on said shaft, a set of cutter shafts in said head and extending at each end therethrough, a drive shaft spaced laterally from the axis of the turret; all the shafts being parallel, means within the head for concurrently shifting all the cutter shafts axially in the head while maintaining their parallelism so that any one of them may be operatively connected to the drive shaft, and means for automatically restoring all unconnected cutter shafts and the shifting means to idle position.

4. In a sole trimming machine, a main bearing, a turret head shaft, a turret head on said shaft, a set of cutter shafts in said head and extending at each end therethrough, a drive shaft spaced laterally from the axis of the turret; all the shafts being parallel, means within the head for concurrently shifting all the cutter shafts axially while maintaining their parallelism so that any one of them may be operatively connected to the drive shaft, and means for automatically restoring all unconnected cutter shafts to idle position, said driving shaft holding the connected cutter shaft in projected position.

5. In a sole trimming machine, a main bearing, a turret head shaft, a turret head on said shaft, a set of cutter shafts in said head and extending at each end therethrough, a lateral drive shaft; all the shafts being parallel, means within the head for concurrently shifting all the cutter shafts axially so that any one of them may be operatively connected to the drive shaft, and means for eccentrically adjusting the turret head to align a selected cutter shaft accurately with the drive shaft.

6. In a sole trimming machine, a main bearing, a turret head shaft, a turret head on said shaft, a set of cutter shafts in said head and extending at each end therethrough, a lateral drive shaft; all the shafts being parallel, means within the head for concurrently shifting all the cutter shafts axially so that any one of them may be operatively connected to the drive shaft, and means for effecting relative transverse adjustment of the cutter shafts and the drive shaft to bring the drive shaft and the connected cutter shaft into accurate axial alinement.

7. In a sole trimming machine, a main bearing, a turret head shaft, a turret head on said shaft, a set of cutter shafts in said head and extending at each end therethrough, a shiftable bearing sleeve for each cutter shaft, a lateral drive means; all the shafts being parallel, and means within the head for concurrently engaging said bearing sleeves and shifting all the cutter shafts axially so that any one of them may be operatively connected to the drive means.

8. In a sole trimming machine, a main bearing, a turret head shaft, a turret head on said shaft, a set of cutter shafts in said head and extending at each end therethrough, a shiftable bearing sleeve for each cutter shaft, a lateral drive shaft; all the shafts being parallel, means within the head for concurrently engaging said bearing sleeves and shifting all the cutter shafts axially so that any one of them may be operatively connected to the drive shaft, and means for centering the co-ordinated cutter shaft and drive shaft.

9. In a sole trimming machine, a main bearing, a turret head shaft, a turret head on said shaft, a set of cutter shafts in said head and extending at each end therethrough, a shiftable bearing sleeve for each cutter shaft, a lateral drive shaft; all the cutter shafts being parallel, means within the head for concurrently engaging said bearing sleeves and shifting all the cutter shafts axially so that any one of them may be operatively connected to the drive shaft, and means for centering the co-ordinated cutter shaft and drive shaft by engagement with the said sleeve.

10. In a sole trimming machine, a main bearing, a turret head shaft, a turret head on said shaft, a set of cutter shafts in said head and extending at each end therethrough, a shiftable bearing sleeve for each cutter shaft, a lateral drive shaft; all the shafts being parallel, means within the head for concurrently engaging said bearing sleeves and shifting all the cutter shafts axially so that any one of them may be operatively connected to the drive shaft, means for centering the co-ordinated cutter shaft and drive shaft by engagement with the said sleeve, and including male and socket means.

11. In a sole trimming machine, a main bearing, a turret head shaft, a turret head on said shaft, a set of cutter shafts in said head and extending at each end therethrough, a lateral drive shaft; all the shafts being parallel, means within the head for concurrently shifting all the cutter shafts axially so that any one of them may be operatively connected to the drive shaft, and means for effecting relative transverse adjustment of the drive shaft and the co-ordinated cutter shaft to bring them into accurate axial alinement.

12. In a sole trimming machine, a main bearing, a turret head shaft, a turret head on said shaft, a set of cutter shafts in said head and extending at each end therethrough, a lateral drive shaft; all the shafts being parallel, and means within the head for concurrently shifting all the cutter shafts axially so that any one of them may be operatively connected to the drive shaft; each cutter shaft having a yieldingly shiftable sleeve bearing.

13. In a sole trimming machine, a main bearing, a turret head shaft, a turret head on said shaft, a set of cutter shafts in said head and extending at each end therethrough, a lateral drive means; all the shafts being parallel, and means within the head for concurrently shifting all the cutter shafts axially so that any one of them may be operatively connected to the drive means; each cutter shaft having a shiftable sleeve bearing, and individual restoring means for each cutter shaft.

14. In a sole trimming machine, a main bearing, a turret head shaft, a turret head on said shaft, a set of cutter shafts in said head and extending at each end therethrough, a lateral drive shaft; all the shafts being parallel, means within the head for concurrently shifting all the cutter shafts axially so that any one of them may be operatively connected to the drive shaft; each cutter shaft having a shiftable sleeve bearing, and individual restoring means for each cutter shaft, said restoring means operative to hold the co-ordinated cutter in operative relation to the drive shaft.

15. In a sole trimming machine, a main bearing, a turret head shaft, a turret head on said shaft, a set of cutter shafts in said head and extending at each end therethrough, a lateral drive shaft; all the shafts being parallel, means within the head for concurrently shifting all the cutter shafts axially so that any one of them may be operatively connected to the drive shaft; said shifting means having a shank extending through the head shaft, and a device on one end of said shank for axially shifting it.

16. In a sole trimming machine, a main bearing, a turret head shaft, a turret head on said shaft, a set of cutter shafts in said head and extending at each end therethrough, a lateral drive shaft; all the shafts being parallel, means within the head for concurrently shifting all the cutter shafts axially so that any one of them may be operatively connected to the drive shaft, and a bushing in the main bearing having an eccentric bore for the head shaft, whereby the cutter shafts may be shifted laterally to accurately align, when selected, with the drive shaft.

17. In a sole trimming machine, a main bearing, a turret head shaft, a turret head on said shaft, a set of cutter shafts in said head and extending at each end therethrough, a lateral drive shaft; all the shafts being parallel, and means within the head for concurrently shifting all the cutter shafts axially so that any one of them may be operatively connected to the drive shaft; said shifting means including a plate having a shank passing through the main journal and having operating means at its outer end.

18. In a sole trimming machine, a main bearing, a turret head shaft, a turret head on said shaft, a set of cutter shafts in said head and extending at each end therethrough, a lateral drive shaft; all the shafts being parallel, means within the head for concurrently shifting all the cutter shafts axially so that any one of them may be operatively connected to the drive shaft; said shifting means including a plate having a shank passing through the main journal and having operating means at its outer end, and bearing sleeves, for the cutter shafts, provided with means engageable by the said plate so as to be shifted thereby.

19. In a sole trimming machine, a main bearing, a turret head shaft, a turret head on said shaft, a set of cutter shafts in said head and extending at each end therethrough, a lateral drive shaft; all the shafts being parallel, and means within the head for concurrently shifting all the cutter shafts axially so that any one of them may be operatively connected to the drive shaft; said shifting means including a plate having a shank passing through the main journal and having operating means at its outer end; the said plate forming a stop to define the idle positions of the cutter shafts.

20. In a sole trimming machine, a main shaft, a cutter, a cutter drive shaft, transmission means connecting the shafts, and means for raising and lowering the drive shaft to present the driven cutter at a convenient position according to the height of the individual working at the machine.

21. In a sole trimming machne, a main shaft, a cutter, a cutter drive shaft parallel thereto, transmission means connecting the shafts, and means for raising and lowering the drive shaft to present the driven cutter at a convenient position according to the height of the individual working at the machine.

22. In a sole trimming machine, a shaft, a cutter, a cutter drive shaft, transmission means connecting the shafts, and means for raising and lowering the drive shaft to present the driven cutter at a convenient position according to the height of the individual working at the machine.

23. In a sole trimming machine, a main shaft, a cutter, a cutter drive shaft, transmission means connecting the shafts, and means for raising and lowering the drive shaft to present the driven cutter at a convenient position according to the height of the individual working at the machine; said transmission means providing for a relative change of speed as to the main shaft.

24. In a sole trimming machine, a main shaft, a cutter, a cutter drive shaft, transmission means connecting the shafts, and means for raising and lowering the drive shaft to present the driven cutter at a convenient position according to the height of the individual working at the machine; said raising and lowering means including a bearing, for the drive shaft, oscillating on the main shaft.

In testimony whereof, I have hereunto set my hand.

SAMUEL PLAWKER.